United States Patent [19]

Labschies

[11] Patent Number: 4,805,462
[45] Date of Patent: Feb. 21, 1989

[54] METHOD AND APPARATUS FOR CONTINUOUSLY MEASURING A FLOW RATE OF A STREAM OF FLOWABLE BULK MATERIAL

[75] Inventor: Hartmut Labschies, Alsbach-Haehnlein, Fed. Rep. of Germany

[73] Assignee: Carl Schenck AG, Darmstadt, Fed. Rep. of Germany

[21] Appl. No.: 189,535

[22] Filed: May 3, 1988

[30] Foreign Application Priority Data

May 25, 1987 [DE] Fed. Rep. of Germany ....... 3717615

[51] Int. Cl.$^4$ ............................................... G01F 1/82
[52] U.S. Cl. .............................. 73/861.36; 73/861.37; 222/71
[58] Field of Search ........... 73/861.35, 861.36, 861.37, 73/861.69, 861.72, 218; 222/71, 406, 410, 414

[56] References Cited

U.S. PATENT DOCUMENTS

| | | | |
|---|---|---|---|
| 2,714,310 | 8/1985 | Jennings | 73/861.36 |
| 4,528,848 | 7/1985 | Hafner | 73/218 |
| 4,700,578 | 10/1987 | Fassbinder | 73/861.37 |

FOREIGN PATENT DOCUMENTS

362542 7/1962 Switzerland .

*Primary Examiner*—Joseph A. Orsino
*Assistant Examiner*—Kenneth Tso
*Attorney, Agent, or Firm*—W. G. Fasse; D. H. Kane, Jr.

[57] ABSTRACT

In a method for continuously determining the delivery rate of a stream or flow of loose bulk material and/or for continuously dosing such material, the loose material is caused to travel along part of a circular path and is then removed from that circular path after travelling at least around a portion of a circle. The centrifugal force exerted by the loose material on the axis of rotation is measured and used to deterine the delivery rate. The centrifugal force is measured by sensing an excursion of a rotational axis of a measuring wheel caused by the centrifugal force exerted by the loose material continuously fed onto and removed from the rotating measuring wheel such that the material travels through a semicircle. Before being fed onto the measuring wheel, the material may be accelerated to the wheel's velocity. The centrifugal force resulting on the wheel axis is measured. An apparatus for carrying out this method includes appropriate drives for the measuring wheel, and arrangements for accelerating, feeding, and discharging the material, as well as a load cell, for example, for measuring the centrifugal force.

19 Claims, 2 Drawing Sheets

METHOD AND APPARATUS FOR CONTINUOUSLY MEASURING A FLOW RATE OF A STREAM OF FLOWABLE BULK MATERIAL

CROSS-REFERENCE TO RELATED APPLICATION

This disclosure is related to U.S. Pat. No. 094,816 filed on Sept. 9, 1987 for: METHOD AND APPARATUS FOR THE CONTINUOUS MEASURING OF BULK MATERIAL PASSING OVER A MEASURING WHEEL.

FIELD OF THE INVENTION

The invention relates to a method for continuously measuring a flow rate or determining the discharge or delivery rate of a stream of loose, pourable or flowable bulk material. The present method can also be used for continuously dosing the delivery of such bulk material. The invention further relates to an apparatus for carrying out the present method.

DESCRIPTION OF THE PRIOR ART

Swiss Patent Publication (CH-PS) No. 362,542 discloses an apparatus for measuring out loose pourable material. The loose material is poured from a feed funnel onto a rotating plate which rotates about a vertical axis. The flowable material is carried on the rotating plate from a feed location to a delivery location, whereby the material travels along at least a portion of a circular path formed by the plate. A stripper blade removes the material from the plate at the delivery location. The rotating plate is arranged on a weighing apparatus, by means of which the weight of the loose material on the platter may be determined. Such an arrangement has a very limited measuring accuracy. However, the known apparatus is so constructed that volume measurements can be supplemented by weight measurements.

OBJECTS OF THE INVENTION

In view of the foregoing it is the aim of the invention to achieve the following objects singly or in combination:

to improve the measurement accuracy of a method for determining or dosing the delivery rate of a stream of loose, pourable or flowable bulk material which is carried on a rotating plate, by measuring the centrifugal force to which the material is exposed as a determining measured characteristic;

to measure and use other essentially constant factors, such as path radius, rotational speed, etc., in addition to the material centrifugal force, which is proportional to the mass of the carried loose material for a given radius and circumferential velocity, for determining and dosing the delivery rate of the material;

to carry the loose material through approximately a semicircular path on the rotating plate of an apparatus for carrying out the present method;

to eliminate ventilation and pressure compensation problems in such a method, especially for easily flowing materials in a closed system;

to eliminate sensitivity to external influences and to make the method independent from or nonsensitive to tare accuracy in such a method;

to achieve a smooth, non-pulsating material delivery in such a method and apparatus; and to achieve a small structural height and other features in such an apparatus, so that it may easily be directly flange-connected to silos, e.g., at a construction site and the like, in a dust-tight manner, without flexible connections.

SUMMARY OF THE INVENTION

The above objects have been achieved in a method according to the invention, in which the loose, flowable material is carried along part of a circular path and then stripped from that path so that the material travels through an approximately semicircular path. During the semicircular travel of the material, the centrifugal force to which the material is exposed, is measured and used for determining the delivery rate and/or for dosing the delivery of the loose, pourable material.

The apparatus according to the invention is suitable for carrying out the present method. The apparatus is enclosed by an approximately cylindrical or pot-shaped housing. A material supply device and a discharge or delivery arrangement for the material are arranged so that a feed location and a discharge location are spaced from each other approximately 180° in the housing. A measuring wheel for receiving the loose material is arranged in the housing with a substantially vertical axis and appropriate drive means. A central bearing for mounting the measuring wheel is arranged on connecting or guide rods. Force measuring means are arranged to brace the central bearing, whereby the connecting or guide rods and the force measuring means cooperate so that the centrifugal forces or at least centrifugal force components exerted by the loose material on the measuring wheel may be detected by the force measuring means.

The invention includes further details of the method and apparatus described generally above. For example, the loose material may be fed into its semicircular path already with the circumferential velocity with which it travels through the semicircular path. The loose material may be fed mechanically or pneumatically into the semicircular path. The semicircular path may be formed by the measuring wheel of the apparatus of the invention. Additionally, an accelerating wheel or paddle wheel may be provided in an upper housing for accelerating the loose material and then feeding the latter through a window onto the measuring wheel which is arranged outside the upper housing to rotate in the same direction as the paddle wheel. The loose material may alternatively be fed to and/or removed from the measuring wheel by a bucket wheel or a bucket wheel sluice. As a further alternative, the loose material may be fed to and/or removed from the measuring wheel with the aid of a compressed air stream. These various feed and/or removal means may be arranged to have a common drive with the measuring wheel.

The invention is based on the fact that the centrifugal force is proportional to the mass or weight of the flowable material moving with a measuring wheel, the radius and circumferential speed of which is known. Thus, it is possible to use the centrifugal force and the known constant factors such as wheel r.p.m. and wheel radius for determining the flow quantity or dosing of bulk material.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
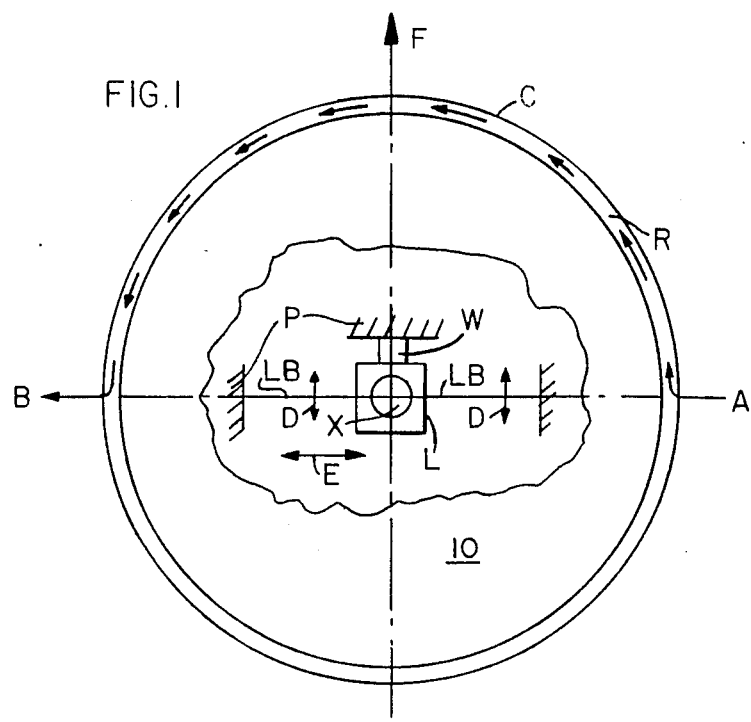
FIG. 1 is a schematic representation of a top plan view of a simplified illustration of an apparatus for carrying out the method of the invention.

As shown in the schematic representation of FIG. 1, loose, pourable or flowable bulk material is brought onto a circular path in a horizontal plane at a feed location A. The loose material travels around the circular path in the direction of the arrows to form a material ring R. After travelling around approximately a half circle, the loose material is discharged or removed from the circular path at a discharge location B. The loose material is guided or prevented from escaping the circular path during its travel around a semicircle, by a vertical rim or collar C arranged around the circumference of the circular path.

The mass center of gravity of the material ring R, or of the loose material contained therein, should remain as constant as possible, even for different through-flows of loose material. Therefore, the material ring R should be as narrow as possible.

The centrifugal force F of the loose material located on the circular path is proportional to the mass m of the loose material and to additional factors such as the radius r of the mass center of gravity of the loose material and the square of the angular velocity w. Thus, the centrifugal force is given by: $F = m \cdot r \cdot w^2$, whereby it is assumed that a steady state situation is established and that the material ring R is as narrow as possible, as mentioned.

Figure 2:
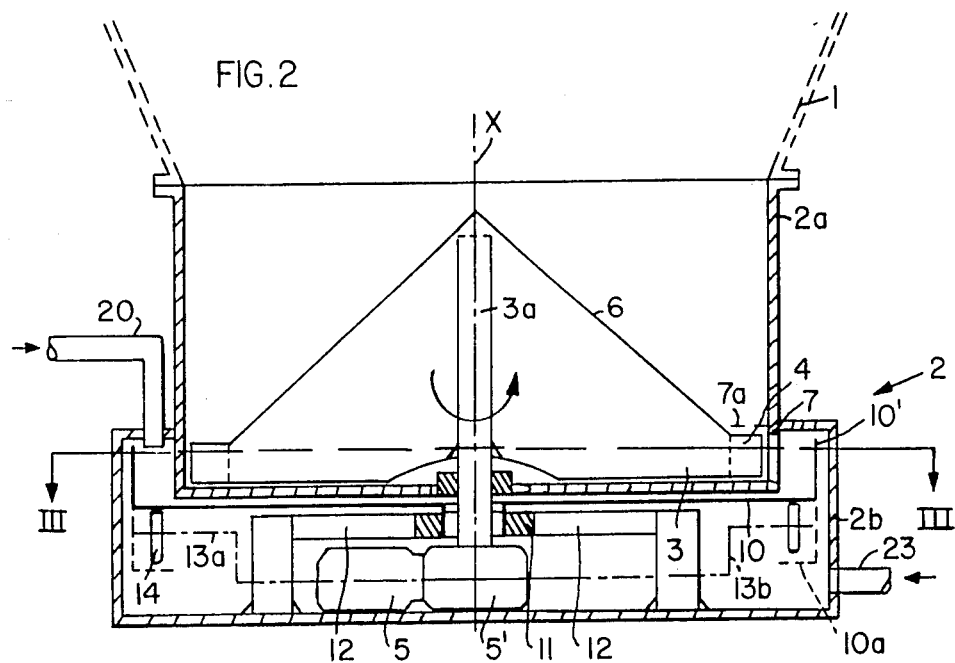
FIG. 2 is a vertical section through an example apparatus for carrying out the present method, with a paddle wheel for feeding loose, pourable flowable material.

The circular path may, for example, be defined or formed by a measuring wheel 10 rotating about a vertical axis X in FIG. 1 or 3a in FIG. 2. The axis X is received and supported by a bearing L which is braced at rigid fixed points P by means of connecting or guide rods LB, which are leaf spring levers for example permitting excursions in the direction of the arrows D but restraining excursions in the direction of the arrow E. Thus, force measuring means W, which comprise a load cell, or a weighing cell, or a strain gage for example, are arranged between the bearing L and a fixed point P to sense excursions in the direction D proportional to the centrifugal force F in the direction D. Since the guide rods LB allow movement of the bearing L perpendicular to the rods LB, but prevent movement in the direction of the levers, accurate measurements of the centrifugal force F are possible. Preferably, the force measuring means W are arranged at 90° relative to the connecting or guide rods LB.

Thus, the guide rods LB and the force measuring means W are so arranged that the centrifugal force F and force components in the direction D are transmitted to or taken up by the force measuring means W, whereas forces and force components in the direction E perpendicular to the centrifugal force direction D are transmitted through the rods LB to rigid fixed points P. Thus, the measurement signal delivered by the force measuring means W for a given rotational velocity and radius of the wheel 10 is a measure of the delivery rate. That is, the signal is proportional to the mass or weight of loose material delivered or to the throughput per unit time, for example in kg/second. Therefore, the signal may be used to monitor the delivery rate, or to adjust the delivery rate of the stream of loose material to achieve a desired dosed delivery.

Figure 3:
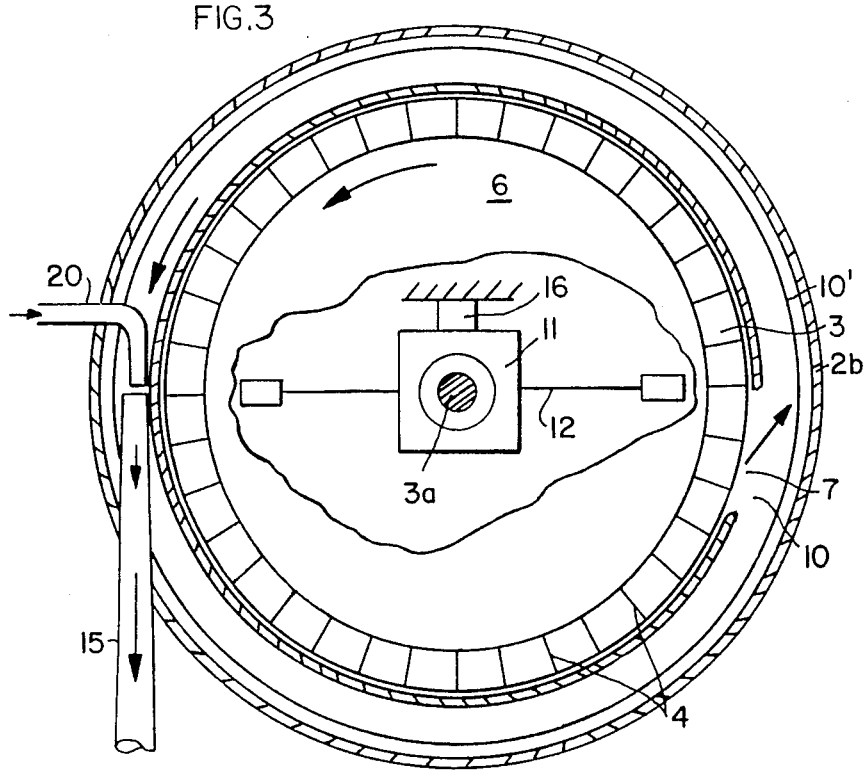
FIG. 3 is a top plan view partially shown as a horizontal section along the line III—III through the apparatus of FIG. 2, and partially broken away.

FIGS. 2 and 3 show a practical example embodiment of the apparatus of the invention, with a paddle wheel arranged on a vertical shaft for feeding or supplying loose material. A cylindrical or pot-shaped upper housing member 2a is attached to a container or silo 1 for storing loose material. A paddle wheel 3 with paddles 4 arranged at uniform spacings around its circumference, is arranged in the upper housing member 2a. The housing member 2a may alternatively have a different shape and may for example have a narrower diameter at its upper end than near the bottom end where the diameter corresponds approximately to that of the paddle wheel 3. The paddle wheel 3 rotates in a horizontal plane and is driven by a drive motor 5 through a gear box and bearing 5' mounting a vertical paddle wheel drive shaft 3a. The loose material travels from the storage container 1 over a cone-shaped feed surface 6 of the paddle wheel 3 into the separate chambers of the paddle wheel 3 formed between adjacent paddles 4. Other material guide means may be provided instead of the cone-shaped feed surface 6. An embodiment of the paddle wheel 3 without special material guide means or feed means is also possible.

Below the upper housing member 2a, a measuring wheel 10 with a vertical circumferential rim 10' is arranged coaxially to the paddle wheel 3 in a lower housing member 2b. The diameter of the measuring wheel 10 is larger than that of the paddle wheel 3 and that of the upper housing member 2a. The measuring wheel 10 rotates in the same direction as the paddle wheel 3. The measuring wheel 10 is supported in a bearing 11 which is attached to connecting and guide rods 12 corresponding to the rods LB of FIG. 1. These rods are leaf spring levers, for example. The arrangement of the rods or levers 12 allows the bearing 11 to move perpendicular to the levers 12, but prevents any movement in the direction of the levers 12, as mentioned above.

The measuring wheel 10 is driven by the motor 5 through drive trains 13 and friction rollers 14. The friction rollers 14 are arranged near the circumference of the measuring wheel 10 at the material feed location A and the material discharge location B as shown in FIG. 1. Alternatively, sate drives may be provided for the measuring wheel 10 and for the paddle wheel 3. Other drive elements, such as gear wheels and a corresponding gear track on the measuring wheel 10 may be used instead of the friction rollers 14. The measuring wheel 10 and the motor 5, as well as any other drive elements and other components, may be hermetically enclosed by the lower housing member 2b.

The rotational speed of the measuring wheel 10 may be adapted to the material characteristics of the loose material to be delivered and/or metered. For example, a rotational speed of 120 r.p.m. may be used. The radius of the measuring wheel 10 may, for example, be between approximately 0.5 and 1.0 meters. These parameters result in circumferential feed advance or delivery velocities of 6-12 m/sec. Other rotational speeds and radii are also possible in a wide range without departing from the present teaching. The loose material which has been brought into the inter-paddle chambers of the paddle wheel 3 as described above, is transferred through a window 7 in the wall of the upper housing member 2a to the measuring wheel 10. The window 7 is arranged at an angle of 90° from the effective direction of the force measuring means 16 described below. If the paddle wheel 3 and the measuring wheel 10 rotate at the same speed, practically no disturbing forces arise at the measuring wheel 10 due to its receiving the loose material from the paddle wheel 3.

A cover plate or cover sheet 7a, as shown by a dashed line in FIG. 2, may extend radially inwardly from the upper housing member 2a above the window 7 for preventing that the loose material flows through the window 7 onto the measuring wheel 10 when the storage container 1 is full and the apparatus is not operating.

The loose or flowable bulk material is transported by the measuring wheel 10 through approximately 180° in the circumferential direction, whereby the material exerts a centrifugal force proportional to its mass or weight against the measuring wheel 10. This centrifugal force (F in FIG. 1) is transmitted through the bearing 11 supported by the connecting rods or levers 12 to be sensed by force measuring means 16, such as load cell or weighing cell means. As shown in FIG. 3, the load cell 16 is arranged in the plane of the bearing 11 and the levers 12. The measured signal of the load cell 16 is a measure of the material delivery rate, for example in kg/sec., of the loose material transported by or located on the measuring wheel 10.

After the measuring wheel 10, along with the carried loose material has rotated through an angle of approximately 180° from the feed location at the window 7, the loose material is removed from the measuring wheel 10 by means of a scoop- or plow-type discharge arrangement 15. The discharge of material may be assisted by a pressurized air supply nozzle 20 acting on the discharge arrangement 15 in the discharge direction.

The measuring wheel 10 may be embodied differently from the example shown in the drawing and described above. For example, the rim 10' of the measuring wheel 10 may be lengthened or extended downwardly and at its bottom edge may comprise a ring surface 10a extending radially inwardly, as shown by a dashed line in FIG. 2. In this case, appropriate openings are provided around the circumference of the measuring wheel 10, or it is otherwise appropriately constructed so that the loose material may fall through from the window 7 onto the ring surface 10a. The loose material may easily be discharged from the ring surface 10a of the measuring wheel 10 toward the center and bottom, by means of a stripping blade or the like not shown. The loose material may then, for example, conveniently be delivered to conveyor means passing below the measuring wheel 10.

Figure 4:
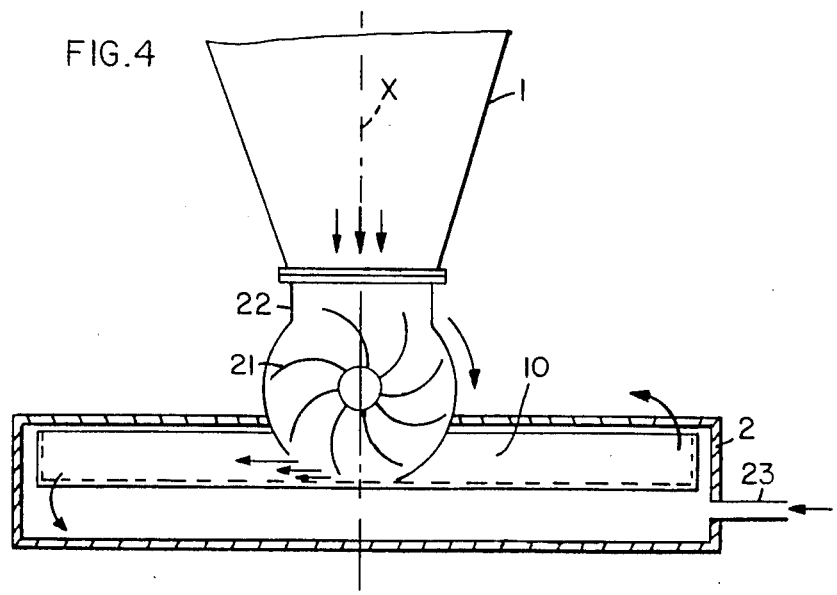
FIG. 4 is a simplified vertical section through an example apparatus with a bucket wheel for feeding loose pourable material onto the measuring wheel.

FIG. 4 shows an example embodiment of the invention having a bucket wheel or bucket wheel sluice for feeding or supplying loose material onto the measuring wheel 10. The bucket wheel 21 is arranged in a housing 22 which may simply be connected by a flange to a material container 1. The specific drive for the bucket wheel is not shown. The rotational speeds of the bucket wheel 21 and the measuring wheel 10 are adapted to each other so that the loose material may be fed to the measuring wheel with practically no disturbance or momentum transfer occurring.

The discharge arrangement may be embodied as described with reference to FIGS. 2 and 3. However, alternatively the discharge of material from the measuring wheel 10 may be achieved by another bucket wheel similar to the bucket wheel for the feed of material to the measuring wheel 10. This discharge bucket wheel would operate in place of the scoop- or plow-type discharge arrangements described above. In FIG. 4, the feed and discharge arrangements, as well as the force measuring means, are arranged as shown schematically in FIG. 1.

As shown in FIGS. 2 and 4, an air supply or flushing air supply 23 may be provided in the housing 2 or 2b. By means of the air supply, or actually by means of the slight pressurization of the housing 2 or 2b, the measuring wheel 10 is, in effect, sealed with respect to the housing 2 or 2b, whereby it is prevented that fine-grained or dust producing loose materials fall through the small gap between the measuring wheel 10 and the housing wall and settle in the lower part of the housing.

The described method as well as the apparatus for carrying out the present method can be used for measuring or controlling the delivery rate of a stream of loose material as well as for dosing or metering loose materials. For the dosing application, the rotational speed of both the feed arrangement, such as a paddle wheel or bucket wheel, and the measuring wheel may be controlled by controlling the motor 5 with reference to the desired nominal values compared to the measured values of the delivery rate. The motor control may also take into account the effect of the mass acceleration.

Although the invention has been described with reference to specific example embodiments, it will be appreciated, that it is intended to cover all modifications and equivalents within the scope of the appended claims.

What I claim is:

1. A method for continuously providing a delivery rate signal representing a stream of loose, flowable bulk material, comprising the following steps:
    (a) continuously rotating a circular path for transporting said bulk material from an inlet port to an outlet port, which are spaced from each other by an approximately semicircular path,
    (b) continuously supplying said bulk material to said inlet port and continuously removing said bulk material from said outlet port,
    (c) measuring a signal representing a centrifugal force effective on said circular path due to the presence of said bulk material on said semicircular path, and
    (d) using said centrifugal force signal for providing said delivery rate signal.

2. The method of claim 1, comprising driving said circular path at a given circumferential velocity, and supplying said bulk material to said inlet port at a velocity corresponding approximately to said circumferential velocity.

3. The method claim 1, wherein said loose material is mechanically fed into and removed from from said circular path.

4. The method of claim 1, wherein said loose material is pneumatically fed into and removed from said circular path.

5. The method of claim 2, further comprising accelerating said bulk material to said circumferential velocity prior to entry of said bulk material at said inlet port.

6. The method of claim 5, wherein said accelerating is performed by means of a bulk material accelerating wheel.

7. The method of claim 5, wherein said accelerating is performed by means of air pressure.

8. The method of claim 1, wherein said bulk material is removed at said outlet port by means of a fluid flow.

9. The method of claim 1, wherein said measuring is performed by sensing a force effective on a rotational axis of said circular path.

10. A method for continuously determining a delivery rate of a stream of loose bulk material having a mass (m) comprising the following steps:
    (a) feeding a loose material stream into a circular path having a mass center radius (r),
    (b) causing said circular path to travel with a certain angular velocity (w),
    (c) removing said loose material from said circular path after having travelled through approximately a semicircular portion of said circular path, whereby said mass (m) exerts a centrifugal force F on said circular path, given by $F = m \cdot r \cdot w^2$,
    (d) detecting a centrifugal force signal, and
    (e) using said centrifugal force signal to determine said delivery rate of said stream of loose material.

11. An apparatus for continuously determining a delivery rate signal for a stream of loose, flowable bulk material, comprising housing means for enclosing said apparatus, measuring wheel means for transporting said bulk material through an approximately semicircular path, material supply means for feeding bulk material into an inlet of said semicircular path, bulk material outlet means for removing said bulk material from said semicircular path, said inlet being spaced from said outlet means by approximately 180°, mounting means including a substantially vertical drive shaft for said measuring wheel means and bearing means for said drive shaft, drive means connected to said drive shaft for rotating said measuring wheel means, said mounting means comprising connecting rods for restraining said bearing means in such a way that a centrifugal force effective on said measuring wheel means due to said bulk material being present on said measuring wheel means, is measurable, and force sensing means operatively connected to said bearing means for sensing said centrifugal force to provide said delivery rate signal.

12. The apparatus of claim 11, wherein said connecting rods are arranged for restraining said bearing means along a straight line defining a first direction and permitting a flexing in a second direction perpendicularly to said straight line, said force sensing means being arranged for sensing a force in said second direction, said inlet and said outlet means being arranged approximately along said straight line.

13. The apparatus of claim 11, wherein said housing means comprise an essentially cylindrical upper housing member and a lower housing member which encloses a lower edge of said upper housing member for housing said measuring wheel means, said apparatus further comprising a material storage container attached to said upper housing member, said lower housing member having a diameter larger than a diameter of said measuring wheel means which in turn is larger than a diameter of said upper housing member, said material supply means comprising a paddle wheel arranged in said upper housing member on said substantially vertical drive shaft and coaxially to said measuring wheel means, an opening in said upper housing member arranged approximately 90° away from an effective force measurement direction, whereby said bulk material falls from said paddle wheel through said opening onto said measuring wheel means.

14. The apparatus of claim 11, wherein said material supply means comprise bucket or paddle wheel means for supplying bulk material onto said measuring wheel means.

15. The apparatus of claim 11, wherein said bulk material removing means comprise scoop- or plow-type blade means for removing bulk material from said measuring wheel means.

16. The apparatus of claim 11, wherein said material supply means and said bulk material removing means comprise airstream nozzle means for transporting said loose bulk material.

17. The apparatus of claim 11, wherein said drive means of said measuring wheel means comprise friction rollers arranged to engage said measuring wheel means essentially at said material supply means and at said bulk material removing means.

18. The apparatus of claim 13, wherein drive means of said measuring wheel means comprise drive transmission means for also driving said material supply means by one common drive.

19. The apparatus of claim 11, wherein said force sensing means comprise load cell means.

* * * * *